(12) United States Patent
Schwartz et al.

(10) Patent No.: US 8,881,576 B2
(45) Date of Patent: Nov. 11, 2014

(54) TEST DEVICE FOR PERFORMING LEAK DETECTION AT A PLURALITY OF TEST SITES

(75) Inventors: Vladimir Schwartz, Lexington, MA (US); Boris Chernobrod, Santa Fe, NM (US)

(73) Assignee: Inficon GmbH, Bad Ragaz (CH)

( * ) Notice: Subject to any disclaimer, the term of this patent is extended or adjusted under 35 U.S.C. 154(b) by 715 days.

(21) Appl. No.: 12/757,651

(22) Filed: Apr. 9, 2010

(65) Prior Publication Data
US 2011/0247401 A1    Oct. 13, 2011

(51) Int. Cl.
| | | |
|---|---|---|
| *G01M 3/04* | (2006.01) | |
| *G01M 3/38* | (2006.01) | |
| *G01M 3/20* | (2006.01) | |

(52) U.S. Cl.
CPC .. *G01M 3/20* (2013.01); *G01M 3/38* (2013.01)
USPC .............. 73/40.7; 73/49.1; 73/49.2; 356/416; 356/437

(58) Field of Classification Search
CPC ........................................ G01M 3/20
USPC ................ 73/40, 40.7, 49.1, 49.2; 422/82.05; 356/416, 437
See application file for complete search history.

(56) References Cited

U.S. PATENT DOCUMENTS

| | | | |
|---|---|---|---|
| 3,762,212 A * | 10/1973 | Morley et al. ................... | 73/40.7 |
| 4,195,907 A * | 4/1980 | Zamja et al. ................... | 385/125 |
| 4,934,816 A * | 6/1990 | Silver et al. .................... | 356/409 |
| 5,748,325 A * | 5/1998 | Tulip .............................. | 356/437 |
| 5,889,404 A * | 3/1999 | Abdel-Rahman et al. .... | 324/464 |
| 5,917,193 A * | 6/1999 | Schroff et al. ................. | 250/573 |
| 5,920,072 A * | 7/1999 | Abdel-Rahman ............. | 250/384 |
| 6,995,846 B2 * | 2/2006 | Kalayeh et al. ............... | 356/437 |
| 7,244,936 B2 * | 7/2007 | Von Drasek ............. | 250/339.13 |
| 7,843,565 B2 * | 11/2010 | Wu et al. ........................ | 356/416 |
| 7,893,408 B2 * | 2/2011 | Hieftje et al. ............. | 250/423 R |
| 7,911,611 B2 * | 3/2011 | Chindo .......................... | 356/370 |
| 2008/0259340 A1* | 10/2008 | Prasad et al. .................. | 356/437 |
| 2011/0247399 A1* | 10/2011 | Schwartz et al. ............... | 73/40.7 |

FOREIGN PATENT DOCUMENTS

DE        19853049        * 11/1998

OTHER PUBLICATIONS

Two-tone frequency-modulation spectroscopy for quantitative measurement of gaseous species: theoretical, numerical, and experimental investigation of the line shapes by V.G. Avestisov and P. Kauranen; Applied Optics, Aug. 20, 1996 / vol. 35, No. 24.*

* cited by examiner

*Primary Examiner* — Hezron E Williams
*Assistant Examiner* — Hoang Nguyen
(74) *Attorney, Agent, or Firm* — Renner, Otto, Boisselle & Sklar, LLP

(57) ABSTRACT

The leak detection device comprises a plurality of measuring cells (10) in whose interior the absorption of a laser beam (17) is influenced by the presence of tracer gas. All of said measuring cells (10) are connected to a host unit (25) via light-conducting fibers (28,34). In the host unit (25), a laser (26) designed for modulation and a photodetector (37) are arranged. Modulation of the laser radiation is preferably performed by two-tone frequency modulation. This has the effect that the fiber length cannot significantly skew the result of the measurement.

4 Claims, 2 Drawing Sheets

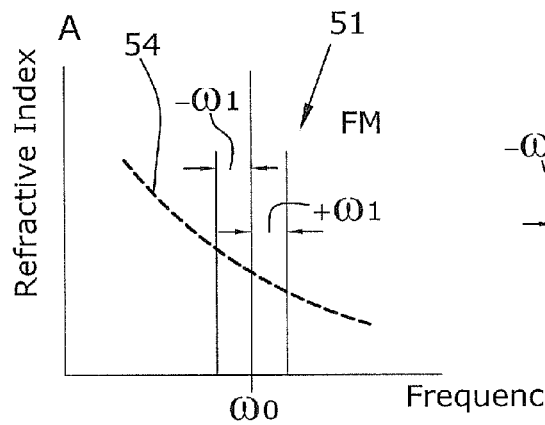
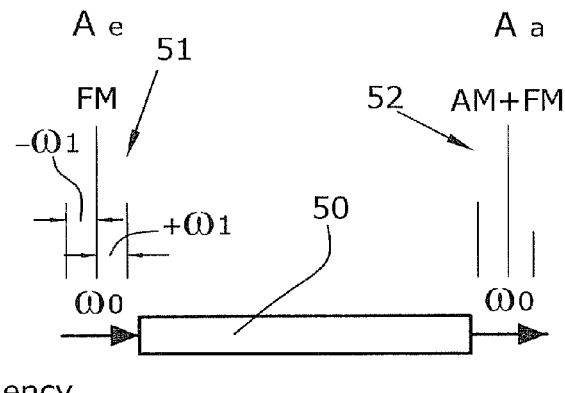
Fig.3          Fig.4
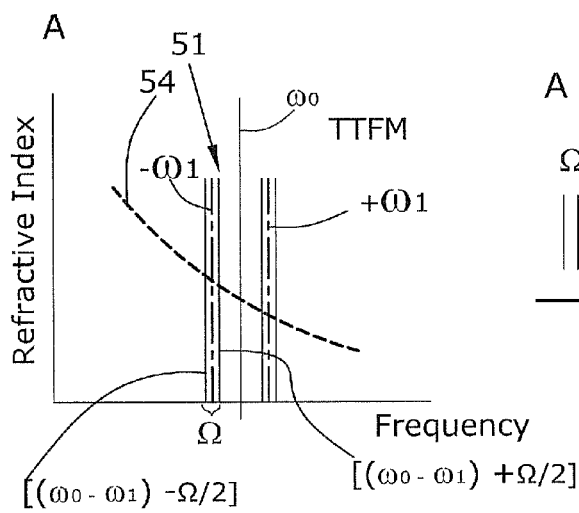
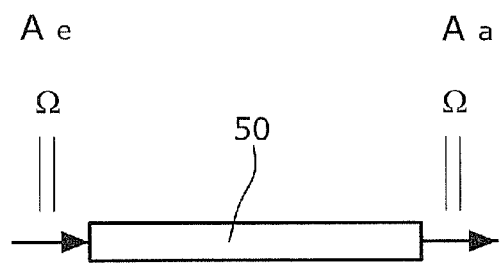
Fig.5          Fig.6

TEST DEVICE FOR PERFORMING LEAK DETECTION AT A PLURALITY OF TEST SITES

BACKGROUND OF THE INVENTION

1. Field of the Invention

The present invention relates to a device for performing leak detection at a plurality of test sites.

2. Description of the Prior Art

For leak detection, use is made of a tracer gas, particularly helium, argon or another inert gas, which will pass through a possibly existing leak and be detected on the opposite side. For detecting the tracer gas, there is normally used a mass spectrometer. Since mass spectrometers are very complex and expensive, also other approaches have been developed for detection of a tracer gas. One such approach consists in using a gas-tight measuring cell which is closed by a membrane that is selectively permeable to the tracer gas. In the interior of the measuring cell, a total pressure is generated which corresponds to the partial pressure of the tracer gas outside the measuring cell. By measurement of the total pressure in the measuring cell, the presence and the concentration of the tracer gas can be determined.

Detection of the gas is also possible by absorption spectroscopy. By excitation, tracer gas existing in the measuring cell can be brought to a higher energetic level which is referred to as a metastable state. Metastable gas atoms have a characteristic absorption spectrum and thus are optically detectable by spectroscopy. In spectroscopy, it is required to modulate a laser beam passing through the metastable gas, and to evaluate the signals of the respective radiation receiver. The apparatus involved therein are very complex. In cases where a plurality of test sites exist, the respective technical investment required will be multiplied accordingly.

It is an object of the invention to provide a device for performing leak detection at a plurality of test sites, said device comprising a host unit which is to be used for all of the measurement sites and which can be situated remote from the measuring sites.

SUMMARY OF THE INVENTION

The device according to the invention is defined by claim 1. Said device comprises a plurality of measuring cells for optical detection of a tracer gas, which measuring cells are connected to a host unit via light-conducting optical fibers. The host unit comprises a frequency-variable laser and a photodetector. The host unit is configured for selective cooperation with each of the measuring cells. Thus, there is required only one host unit in which the laser beam will be generated and modulated and which further includes the evaluation unit for evaluating the received laser radiation. This makes it possible, in a technical installation, to distribute a large number of measuring cells onto different sites where leak detection is required. Evaluation of all leak tests is carried out in the host unit.

The means for transforming the tracer gas into a metastable state can comprise electrodes for generating a plasma using a buffer gas. Said plasma excites the tracer gas into a higher energetic state which is optically detectable. A further option for excitation into the metastable state is bombardment with electrons from an electron source. In this case, no buffer gas will be required.

In the device of the invention, signal transmission is performed via light conductors bridging the distance between the individual measuring cells and the host unit and establishing a connection between the measuring cells and the host unit. In the host unit, the laser beam will be modulated, and in the measuring cell, the modulation spectrum will be changed corresponding to the characteristic absorption line of the tracer gas. The resulting signal will be returned to the host unit via light-conducting fibers.

Preferably, the laser is operated with two-tone modulation (TTM). In TTM spectroscopy, two relatively closely adjacent modulation frequencies are generated whose frequency spacing (intermediate frequency) is relatively small, preferably under 1 MHz. Such an intermediate frequency $\Omega$ is not affected by chromatic dispersion in optical fibers. Thus, for applications with high modulation frequencies and long optical transmission paths, TTM spectroscopy is particularly useful. TTM spectroscopy is described in greater detail in Avetisov V. G. and Kauranen P., Appl. Opt. 35, 4705 (1996). A further limiting factor is the absorption in the optical fiber. For wavelengths of 1083 nm, this absorption will be about 1.3 dB/km; for higher wavelengths, however, it will be lower.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which FIG. 3 is a diagram representing the fiber transmission versus the frequency, with the characteristic chromatic dispersion line of the fiber superimposed, FIG. 4 is a diagram representing the frequency spectra at the input and the output of a light-conducting fiber, for the cases of single-frequency modulation of the input beam and resulting amplitude modulation of the output beam, FIG. 5 is a diagram representing the signal spectrum for two-tone frequency modulation, with the characteristic chromatic dispersion line of the fiber, respectively, and FIG. 6 is a diagram representing the spectra at the input and the output of the light-conducting fiber, for TTFM modulation.

DESCRIPTION OF PREFERRED EMBODIMENTS

Figure 1:
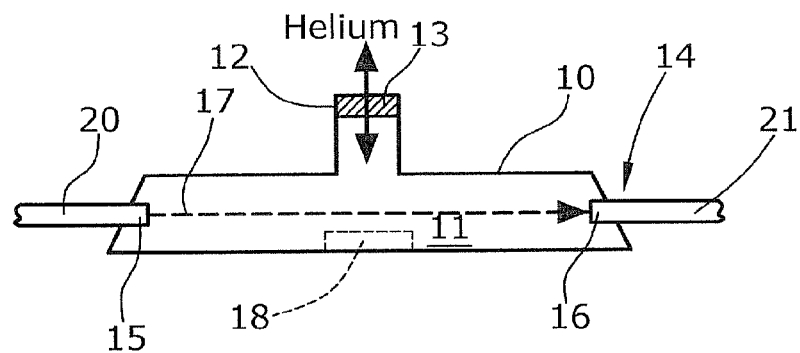
FIG. 1 is a schematic view of a measuring cell.

FIG. 1 illustrates a measuring cell 10 for optical detection of a tracer gas, particularly helium. Measuring cell 10 is made of a gas-impermeable material, particularly of glass. The interior 11 of measuring cell 10 is closed by a test-gas inlet 12. Said test-gas inlet 12 includes a membrane 13 which is exclusively or preferably permeable to the tracer gas but is impermeable to other gases. Membrane 13 is permeable in both directions, resulting in a pressure in the interior 11 of cell 10 that is equal to the partial pressure of the tracer gas externally of the cell. Cell 10 has been evacuated beforehand so that it cannot contain any other gas except for the tracer gas. Within cell 10, an excitation means 18 is arranged for transforming the tracer gas into a higher excitation state. Said excitation means 18 can be an electron source adapted to bombard the tracer gas with electrons, thus transforming it into a higher excitation state. In another cell type, a gas discharge path can be provided wherein a buffer gas will be ionized for bringing the tracer gas into a higher excitation state. The inducing of the metastable state can also be effected by X-rays, by multiphoton excitation, by Raman type population and by collision with neutral atoms/molecules, e.g. by an ultrasonic beam.

For optical detection of the metastable tracer gas, use is made of a measuring path 14 comprising a radiation source 15 and a radiation receiver 16 receiving the laser beam 17 of said radiation source. The wavelength of the laser beam emitted by radiation source 15 is set e.g. to 1083.034 nm, so that, with helium being used as the tracer gas, starting from the metastable condition $2^3S_1$, a higher energy level of $2^3P_2$ can be reached. With a laser wavelength of 1083.025 nm, the energy level of $2^3P_1$ would be reached, and with a wavelength of 1082.908 nm, the energy level of $2^3P_0$ would be reached. When tracer gas being in its metastable state is hit by a laser beam of the designated wavelength, the radiation of this wavelength will be absorbed. Details can be gathered from DE 198 53 049 C2.

Instead of the above described type of measurement cell, one can use similar measuring cells in modified versions, e.g. a measuring cell connected to a pump device for removal of tracer gas from the interior of the measuring cell.

Radiation source 15 is a part of a light-conducting fiber 20, and radiation receiver 16 is a part of a light-conducting fiber 21.

Figure 2:
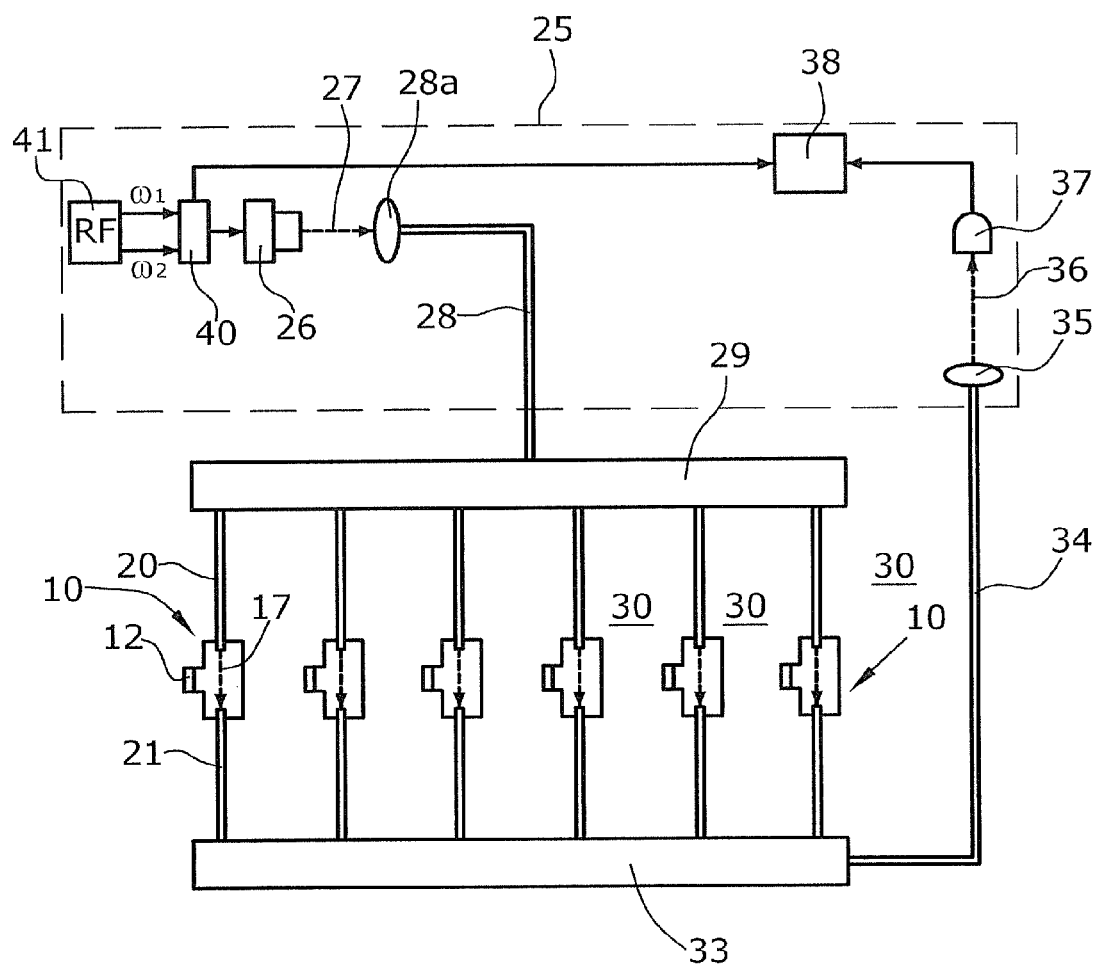
FIG. 2 is a schematic view of a network comprising a plurality of measuring cells connected to a host unit.

As shown in FIG. 2, a host unit 25 is provided for generating therein the laser beams for all measuring cells 10 and for evaluating therein the laser radiation exiting from the measuring cells. Said host unit 25 includes a laser 26 with controllable laser wavelength. With the aid of a coupling-in device 28a, the laser beam 27 generated by the laser is coupled into a light-conducting fiber 28 leading to a beam splitter 29. Said beam splitter 29 will distribute the laser beam simultaneously or sequentially onto the light-conducting fibers 20 of the individual measuring cells 10, which cells are arranged at different test sites 30 so as to be able to detect tracer gas independently from each other at different test sites. The laser beam 17 will be coupled out from said light-conducting fiber 20 and, after passing through the metastable tracer gas, the laser beam will be incoupled into said light-conducting fiber 21. All of said light-conducting fibers 21 are connected to a beam selector 33 which will selectively couple the light-conducting fibers 21 to a light-conducting fiber 34 connected to host unit 25. There, an output coupling device 35 is arranged which is operative to feed the emergent light beam to a photodetector 37 connected to a processor 38.

Said laser 26 is controlled by a controller 40 which also has the function of a modulator for modulating the laser beam with the two frequencies of a frequency generator 41.

FIGS. 3 and 4 show representations of the amplitudes A of the spectra at the input and at the output of the entire light-conducting fiber path 50 including the measuring cell 10. The input spectrum 51 includes a center frequency $\omega_0$ which is the radiation frequency of the laser, and two sidebands which are defined by the modulation frequency. Also represented in FIG. 3 is the nonlinear characteristic chromatic dispersion line 54 of the light-conducting fiber. In the resulting output spectrum 52, the sidebands have different amplitudes.

The representations in FIGS. 3 and 4 are based on the cases where a frequency modulation FM of the laser radiation is performed. If the modulation frequency $\omega_1$ is smaller than 1 MHz (in wavelength modulation), the chromatic dispersion is negligibly small for a length of several tens of kilometers. For high modulation frequencies (in the GHz range and above), the dispersion will lead to a FM/AM conversion which is not distinguishable from an absorption by metastable gas in the measuring cell.

A solution is offered by the two-tone modulation (TTFM) as represented by FIGS. 5 and 6. In addition to a first modulation with the frequency $\omega_1$ (e.g. 1 GHz), a second modulation is performed with a much lower second frequency $\Omega \leq 10$ MHz. The first frequency $\omega_1$ is situated in the GHz range, and the second frequency $\Omega$ in the MHz range. In FIG. 5, the input spectrum 51 is represented. The two modulation frequencies $\omega_1, \Omega$ are generated and processed simultaneously, thus generating the side bands $(\omega_0-w_1)\pm\frac{1}{2}\Omega$ and $(\omega_0+\omega_1)\pm\frac{1}{2}\Omega$.

In FIG. 4, the spectrum of the frequencies of the single-frequency-modulated laser (FM) with the amplitude A, is represented on the input side of the fiber path 50, and the same frequencies with amplitude $A_a$ effected by the fiber chromatic dispersion are represented on the output side. In two-tone frequency modulation according to FIG. 6, by contrast, the amplitude of the frequency $\Omega$ will not be significantly influenced along the length of the light conductor path, neither due to chromatic dispersion nor due to absorption.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A device for performing leak detection at a plurality of test sites, said device comprising a plurality of measuring cells for optical detection of a tracer gas, each of said measuring cells including an excitation means for transforming the tracer gas into a metastable state, a radiation source and a radiation receiver, and comprising a host unit, said host unit including a frequency-variable laser and a photodetector and being connected to the measuring cells via light-conducting fibers forming said radiation source and said radiation receiver, and wherein said laser is operated by two-tone frequency modulation (TTFM) by generating side bands $(\omega_0-\omega_1)\pm\frac{1}{2}\Omega$ and $(\omega_0+\omega_1)\pm\frac{1}{2}\Omega$ for the emitted laser radiation being guided via the light-conducting fibers, wherein $\omega_0$ is the laser center frequency $\omega_1$ is a first modulation frequency equal to or above 1 GHz and $\Omega$ is a second modulation frequency equal to or below 10 MHz.

2. The device according to claim 1, wherein, between the host unit and the measuring cells, a beam splitter is provided for feeding a single laser beam simultaneously or successively to all individual measuring cells.

3. The device according to claim 1, wherein, between the measuring cells and the host unit, a beam selector is provided by which a plurality of laser beams emitted by the measuring cells are fed simultaneously or successively to a light conductor leading to the host unit.

4. The device according to claim 1, wherein the two-tone frequency modulation is characterized by a frequency spacing of less than 1 MHz.

* * * * *